United States Patent
Park

(10) Patent No.: US 8,786,258 B2
(45) Date of Patent: Jul. 22, 2014

(54) BATTERY PACK AND METHOD OF CONTROLLING THE BATTERY PACK

(75) Inventor: Tae-Heom Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 668 days.

(21) Appl. No.: 12/929,607

(22) Filed: Feb. 3, 2011

(65) Prior Publication Data

US 2011/0234168 A1    Sep. 29, 2011

(30) Foreign Application Priority Data

Mar. 29, 2010  (KR) .................. 10-2010-0028079

(51) Int. Cl.
*H02J 7/00* (2006.01)

(52) U.S. Cl.
USPC .................. 320/136; 320/134; 320/135

(58) Field of Classification Search
USPC ......................... 320/112, 134–136
See application file for complete search history.

(56) References Cited

U.S. PATENT DOCUMENTS

| | | | |
|---|---|---|---|
| 6,163,131 A * | 12/2000 | Gartstein et al. ............. | 320/118 |
| 6,955,859 B2 | 10/2005 | Kimura et al. | |
| 7,186,473 B2 * | 3/2007 | Shiue et al. .................. | 429/7 |
| 7,589,499 B2 * | 9/2009 | Denning et al. ............. | 320/134 |
| 7,932,700 B2 * | 4/2011 | Cintra et al. ................. | 320/135 |
| 8,228,037 B2 * | 7/2012 | Furukawa et al. ........... | 320/134 |

| | | | |
|---|---|---|---|
| 2008/0101146 A1 | 5/2008 | Paak et al. | |
| 2009/0218320 A1 | 9/2009 | Wang | |
| 2009/0218932 A1 | 9/2009 | Wang | |

FOREIGN PATENT DOCUMENTS

| | | |
|---|---|---|
| JP | 08-055639 A | 2/1996 |
| JP | 2000-223266 A | 8/2000 |
| JP | 2000-252058 A | 9/2000 |
| JP | 2002-354702 A | 12/2002 |
| KR | 10 2001-0036801 A | 5/2001 |
| KR | 10 2001-0109011 A | 12/2001 |
| KR | 10 2001-0111846 A | 12/2001 |
| KR | 10 2003-0080846 A | 10/2003 |
| KR | 10 2006-0027543 A | 3/2006 |
| KR | 10 2006-0028212 A | 3/2006 |
| KR | 10-2006-0062446 A | 6/2006 |
| KR | 10 2006-0079615 A | 7/2006 |
| KR | 10-2008-0034643 A | 4/2008 |
| KR | 10-2008-0066172 A | 7/2008 |
| KR | 10-2008-0078182 A | 8/2008 |
| KR | 10 2009-0014897 A | 2/2009 |
| KR | 10 2009-0076659 A | 7/2009 |
| KR | 10 2009-0084147 A | 8/2009 |
| KR | 10 2010-0056752 A | 5/2010 |

OTHER PUBLICATIONS

Korean Notice of Allowance in KR 10-2010-0028079, dated Oct. 31, 2011 (Park).

* cited by examiner

*Primary Examiner* — Richard V Muralidar
(74) *Attorney, Agent, or Firm* — Lee & Morse, P.C.

(57) ABSTRACT

A battery pack includes a battery cell, a current converting unit connected between the battery cell and a load and converts a discharge current of the battery cell, and a microcomputer that determines an amount of a discharge current of the battery cell and controls the current converting unit based on the amount of the discharge current. Accordingly, a current needed for the load may be adjusted in the battery pack.

19 Claims, 3 Drawing Sheets

BATTERY PACK AND METHOD OF CONTROLLING THE BATTERY PACK

BACKGROUND

1. Field

One or more embodiments of the present invention relate to a battery pack, and more particularly, to an active type battery pack and a method of controlling the same.

2. Description of the Related Art

In general, rechargeable batteries are actively researched due to the development of mobile electronic appliances such as cellular phones, laptop computers, camcorders, personal digital assistants (PDA), and the like. Examples of rechargeable batteries include nickel-cadmium batteries, lead storage batteries, nickel metal hydride batteries, lithium ion batteries, lithium polymer batteries, metal lithium batteries, and air zinc storage batteries. A rechargeable battery is combined with a circuit to form a battery pack and is charged or recharged via an external terminal of the battery pack.

A battery pack of the related art includes a battery cell and a peripheral circuit including a charge/discharge circuit. The peripheral circuit is formed of a printed circuit board and is combined with the battery cell. When an external power source is connected to the battery pack via an external terminal, the battery cell is charged by the external power source via the external terminal and the charge/discharge circuit. When a load is connected to the external terminal, the battery cell supplies power to the load via the charge/discharge circuit and the external terminal. The charge/discharge circuit is arranged between the external terminal and the battery cell and controls charging and discharging of the battery cell.

SUMMARY

Embodiments are therefore directed to a battery pack and a method of controlling the battery pack, which substantially overcome one or more of the problems due to the limitations and disadvantages of the related art.

It is therefore a feature of an embodiment to provide a battery pack in which a current applied to a load may be adjusted in the battery pack.

It is therefore another feature of an embodiment to provide a method of controlling the battery pack.

At least one of the above and other features and advantages may be realized by providing a battery pack including a battery cell, a current converting unit connected between the battery cell and a load to convert a discharge current of the battery cell, and a microcomputer that determines an amount of a discharge current of the battery cell and controls the current converting unit based on the amount of the discharge current.

The current converting unit may adjust a discharge current of the battery cell according to the control of the microcomputer.

The microcomputer may detect a remaining capacity of the battery cell, and may determine the amount of the discharge current of the battery cell based on the detected remaining capacity, a current consumption, and a time of use of the load.

The microcomputer may include a user interface that receives an expected time of use from a user and uses the expected time of use as the time of use of the load.

The current converting unit may include at least one switch, the at least one switch being controlled by the microcomputer.

The current converting unit may include at least one switch, and at least one resistance serially connected to the at least one switch, the at least one switch being controlled by the microcomputer. The at least one resistance may include a first resistance and a second resistance, different from the first resistance.

The current converting unit may include a variable resistance, a resistance value of the variable resistance being varied according by the microcomputer.

The battery pack may include a charging device connected between the battery cell and the load, and a discharging device connected between the battery cell and the load, in parallel to the current converting unit.

At least one of the above and other features and advantages may be realized by providing a battery pack, including a battery cell, a charging device connected between the battery cell and a first node, a discharging device connected between the first node and a load, a current converting unit connected in parallel to the discharging device, and a microcomputer that controls the charging device, the discharging device, and the current converting unit.

The current converting unit may adjust a discharge current to the load according to the control of the microcomputer.

The current converting unit may include a switch that is turned on or off according to the control of the microcomputer, and a variable resistance serially connected to the switch.

The current converting unit may include at least two switches controlled by the microcomputer, and at least two resistances, respectively serially connected to the at least two switches, having different resistance values.

The microcomputer may determine an amount of a discharge current of the battery cell and controls the current converting unit based on the amount of the discharge current.

The microcomputer may detect a remaining capacity of the battery cell, and may determine the amount of the discharge current of the battery cell based on the detected remaining capacity, a current consumption, and a time of use of the load.

The microcomputer may include a user interface that receives an expected time of use from a user and uses the expected time of use as the time of use of the load.

The current converting unit may include a variable resistance, a resistance value of the variable resistance being varied according by the microcomputer.

At least one of the above and other features and advantages may be realized by providing a method of controlling a battery pack, the method including detecting a remaining capacity of a battery cell, comparing the detected remaining capacity with an expected current consumption amount according to a time of use of a load, and converting a discharge current that is to flow to the load according to the amount of the discharge current.

The method may include receiving an expected time of use from the user and using the expected time of use as the time of use of the load.

Converting the discharge current may include controlling at least one of a state of a switch and a value of a resistance serially connected to the switch.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
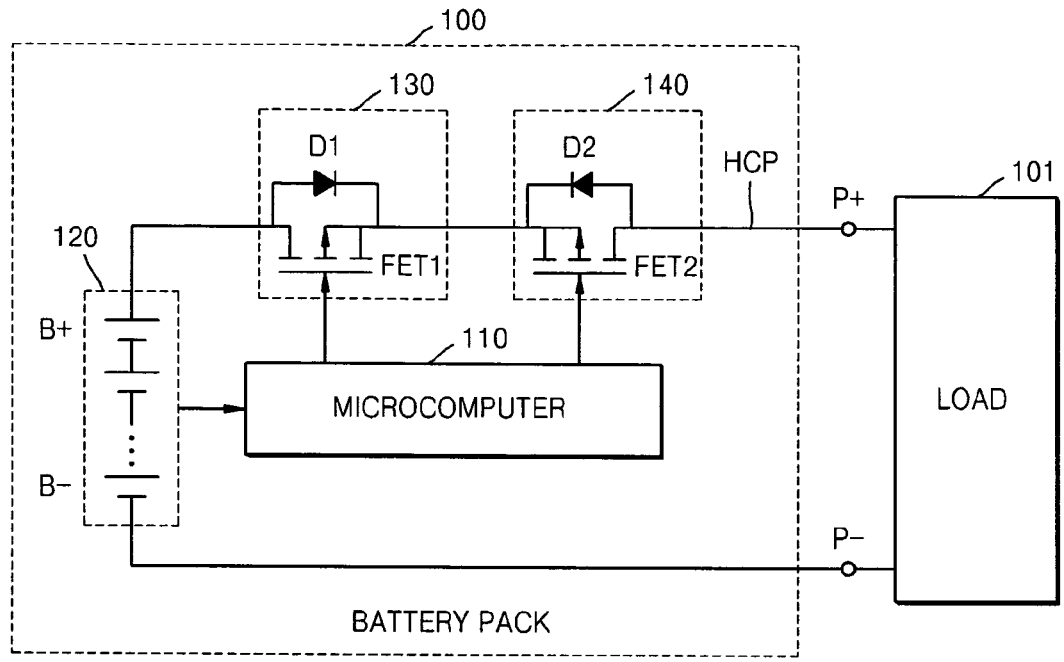
FIG. 1 illustrates a schematic view of a battery pack.

Korean Patent Application No. 10-2010-0028079, filed on Mar. 29, 2010, in the Korean Intellectual Property Office, and entitled: "Battery Pack and Method of Controlling the Battery Pack," is incorporated by reference herein in its entirety.

Example embodiments will now be described more fully with reference to the accompanying drawings. In the description, certain detailed explanations of related art are omitted when it is deemed that they may unnecessarily obscure the description of embodiments. Like reference numerals refer to like elements throughout.

FIG. 1 illustrates a circuit diagram of a battery pack 100 including a rechargeable battery cell 120 and a protection circuit.

In detail, the battery pack 100 includes the battery cell 120, an external terminal (not shown) connected in parallel to the battery cell 120, a charging device 130 and a discharging device 140 serially connected to a high current path (HCP) between the battery cell 120 and the external terminal, and the protection circuit. The protection circuit includes a microcomputer 110 connected in parallel to the battery cell 120, the charging device 130, and the discharging device 140.

Although not shown in FIG. 1, the protection circuit of the battery pack 100 may further include a current sensing unit serially connected to the HCP between the battery cell 120 and the external terminal, and also connected to the microcomputer 110, and a self-protecting control unit used to blow a fuse positioned on the HCP according to the controlling of the microcomputer 110 or the external system. If the battery cell 120 is determined to be over-charged or over-discharged, the microcomputer 110 turns off the charging device 130 and the discharging device 140 or blows the fuse to block over-charging or over-discharging of the battery cell 120. That is, when the battery cell 120 is determined to be over-charged or over-discharged, the microcomputer 110 outputs a corresponding control signal to turn off the charging device 130 and the discharging device 140 or to blow the fuse using the self-protecting control unit.

The battery pack 100 is connected to the external system via the external terminal to be charged or discharged. The HCP between the external terminal and the battery cell 120 is used as a charge/discharge path, and has a relatively large current flowing there through. The battery pack 100 may further include a system management BUS (SMBUS) between the microcomputer 110 of the protection circuit and the external terminal for the purpose of communicating with the external system.

Figure 2:
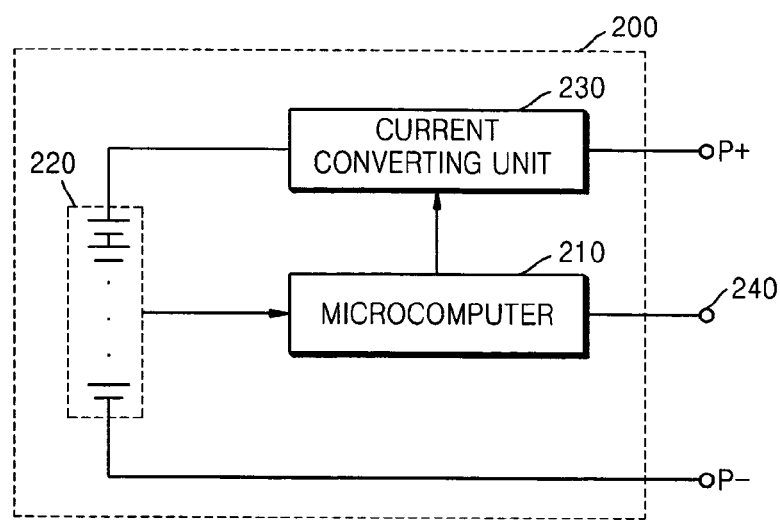
FIG. 2 illustrates a schematic view of a battery pack according to an embodiment.

FIG. 2 illustrates a schematic view of a battery pack 200 according to an embodiment. Referring to FIG. 2, the battery pack 200 includes a microcomputer 210, a battery cell 220, and a current converting unit 230. However, the battery pack 200 is not limited thereto, and may further include a protection circuit including components of a general battery pack, e.g., a charging device, a discharging device, an analog front end (AFE), a current sensing unit, a fuse, and the like.

The current converting unit 230 is connected between the battery cell 220 and a load (not shown), and converts a discharge current of the battery cell 220. The current converting unit 230 is serially connected to a high current path (HCP) to convert a discharge current of the battery cell 220. The discharge current may be converted by modifying a discharge path using at least two switches or by arranging a variable resistance on the HCP, but is not limited thereto.

The microcomputer 210 determines an amount of a discharge current of the battery cell 220 and controls the current converting unit 230 based on the amount of the discharge current. The microcomputer 210 detects a remaining capacity of the battery cell 220. The microcomputer 210 may receive voltage information of a battery from an AFE (not shown) that measures a voltage of the battery cell 220. The microcomputer 210 may determine the amount of the discharge current of the battery cell 220 based on a current consumption according to the remaining capacity of the battery cell 220 and the time of use of the load. Also, the microcomputer 210 may convert the discharge current by controlling the current converting unit 230 so as to output the determined amount of the discharge current.

Also, the microcomputer 210 may include a user interface through which an expected time of use of the load is received from the user. Through the user interface, the microcomputer 210 may receive an expected time of use of the load that is input through the external device 240. For example, when the microcomputer 210 receives an expected time of use of a load, e.g., information that the user is going to use a laptop computer for some period of time, the microcomputer may reduce the discharge current amount in accordance with remaining battery capacity and the expected time. For example, if the expected time is four hours, the remaining battery capacity is presently 3 mA, and a current consumption is presently 3 mA for 1 hour, the microcomputer 210 determines allowable current consumption to be about 0.73 mA for the expected 4-hour usage, and converts a current so as to output a discharge current of 0.73 mA.

Figure 3:
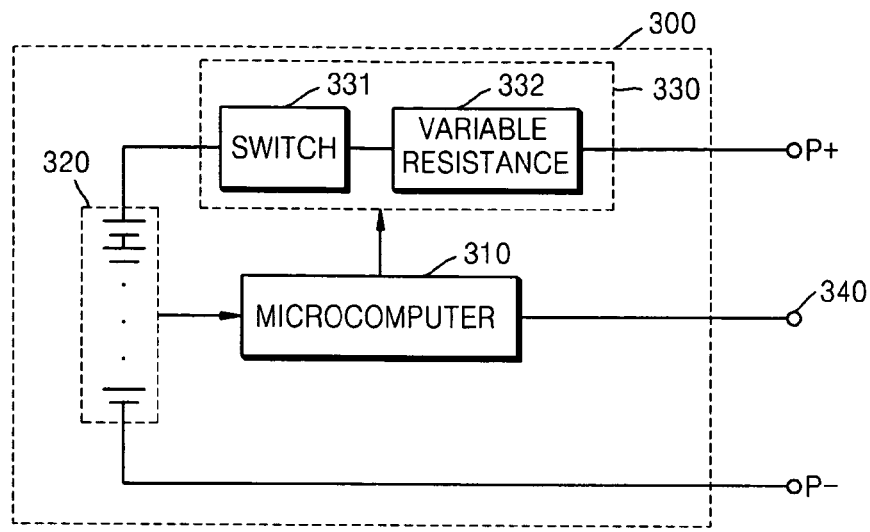
FIG. 3 illustrates a schematic view of a current converting unit illustrated in FIG. 2 according to an embodiment.

FIG. 3 illustrates a schematic view of a current converting unit 330 for use as the current converting unit 220 of FIG. 2 according to an embodiment. Referring to FIG. 3, the current converting unit 330 includes a switch 331 and a variable resistance 332 serially connected to the switch 331.

A microcomputer 310 may control the current converting unit 330. In particular, the microcomputer 310 may turn the switch 331 on or off according and control the variable resistance 332 to have different resistance values. The switch 331 may be a field effect transistor (FET). A range of resistance values of the variable resistance 332 may be determined according to a capacity of a battery cell or a current consumption amount of a load.

A battery pack 300 illustrated in FIG. 3 includes only the microcomputer 310, a battery cell 320, and the current converting unit 330, but may also further include a charging device and a discharging device formed of field effect transistors (FETs). In this case, the current converting unit 330 may be arranged in parallel to the discharging device, and a discharge current may flow according to a current consumption amount of a load via the discharging device. When the amount of the discharge amount according to an embodiment needs to be actively adjusted, the discharging device is turned off and the switch 331 is turned on so that a smaller current than the current flowing through the discharging device flows to the load. In this case, an FET having a smaller allowable current than the FET used as the discharging device may be used as the switch 331.

Also, an expected time of use of a load may be input by the user through a terminal 340 illustrated in FIG. 3. When a battery remaining capacity is insufficient compared to an expected current consumption amount according to the input expected time of use, the microcomputer 310 determines a discharge current amount according to the expected time of use, and turns on the switch 331 to convert a discharge current.

Figure 4:
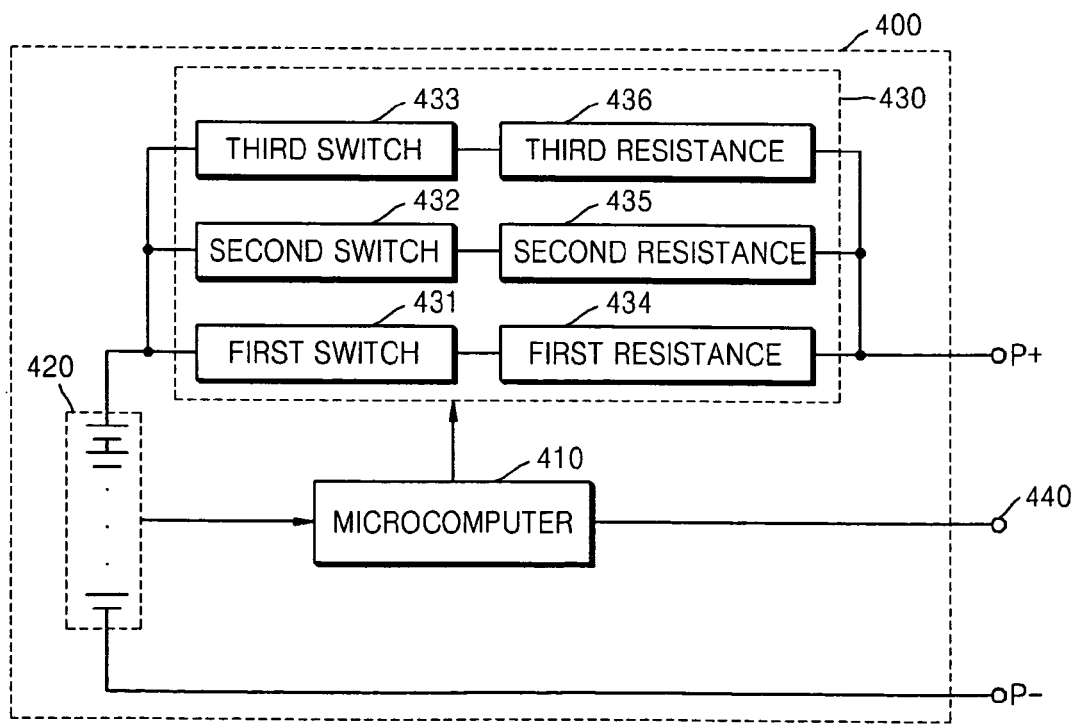
FIG. 4 illustrates a schematic view of a current converting unit illustrated in FIG. 2 according to another embodiment.

FIG. 4 illustrates a schematic view of a current converting unit 430 for use as the current converting unit 220 of FIG. 2 according to another embodiment. Referring to FIG. 4, the current converting unit 430 includes three current paths and is provided between a battery cell 420 and a load (not shown).

A first current path is formed of a first switch 431 and a first resistance 434. A second current path is formed of a second switch 432 and a second resistance 435. A third current path is formed of a third switch 433 and a third resistance 436. The first through third resistances 434 through 436 have different resistances. A microcomputer 410 turns the first through third switches 431 through 433 turned on or off. The microcomputer 410 may also receive an expected time of use of the load through a terminal 440 illustrated in FIG. 4 and may compare a remaining battery capacity and the expected time of use with a current consumption amount of the load to determine a discharge current amount. Then, a current path through which a current corresponding to the discharge current may be transmitted to the load is selected from the first through third current paths and a corresponding switch is turned on.

Figure 5:
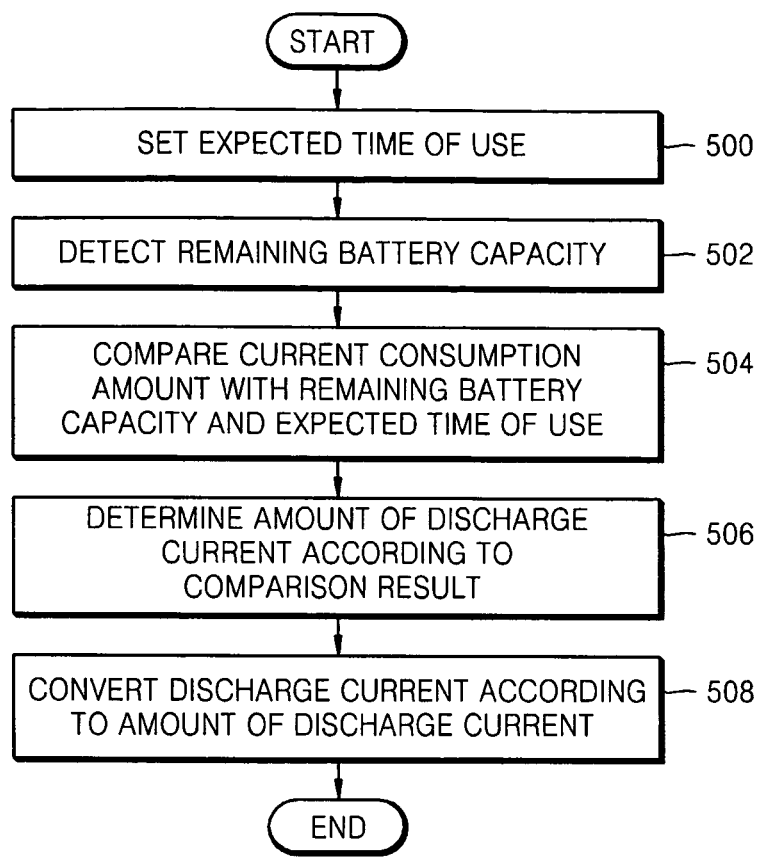
FIG. 5 illustrates a flowchart of a method of controlling a battery pack according to another embodiment.

FIG. 5 illustrates a flowchart of a method of controlling a battery pack according to another embodiment.

Referring to FIG. 5, in operation 500, an expected time of use of a load is set. An expected time of use of the load may be input by the user via a user interface.

In operation 502, a remaining battery capacity is detected. In operation 504, the detected remaining battery capacity and an expected current consumption amount of the load according to the time of use are compared. In operation 506, a discharge current amount is determined according to a comparison result of operation 504.

In operation 508, a discharge current to the load is converted according to the amount of the discharge current. The discharge current may be converted using separate discharge paths or a variable resistance in the discharge path.

According to the embodiments, the battery pack includes a current converting unit connected between the battery cell and the load to convert a discharge current of the battery cell, and a microcomputer that determines an amount of the discharge current of the battery cell and controls the current converting unit based on the amount of the discharge current, thereby adjusting a current needed for the load in the battery pack.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack comprising:
a battery cell;
a current converting unit connected between the battery cell and a load to convert a discharge current of the battery cell; and
a microcomputer that determines an amount of a discharge current of the battery cell and a remaining capacity of the battery cell, and controls the current converting unit based on the amount of the discharge current and the remaining capacity of the battery cell.

2. The battery pack as claimed in claim 1, wherein the current converting unit adjusts a discharge current of the battery cell according to the control of the microcomputer.

3. The battery pack as claimed in claim 1, wherein the current converting unit includes at least one switch, the at least one switch being controlled by the microcomputer.

4. The battery pack as claimed in claim 1, wherein the current converting unit comprises:
at least one switch; and
at least one resistive circuit element serially connected to the at least one switch, the at least one switch being controlled by the microcomputer.

5. The battery pack as claimed in claim 4, wherein the at least one resistive circuit element includes a first resistive circuit element and a second resistive circuit element different from the first resistive circuit element.

6. The battery pack as claimed in claim 1, wherein the current converting unit comprises a variable resistance, a resistance value of the variable resistance being varied according by the microcomputer.

7. The battery pack as claimed in claim 1, further comprising:
a charging device connected between the battery cell and the load; and
a discharging device connected between the battery cell and the load, in parallel to the current converting unit.

8. A battery pack, comprising:
a battery cell;
a current converting unit, connected between the battery cell and a load, to convert a discharge current of the battery cell; and
a microcomputer to determine an amount of a discharge current of the battery cell and control the current converting unit based on the amount of the discharge current, wherein the microcomputer:
detects a remaining capacity of the battery cell; and
determines the amount of the discharge current of the battery cell based on the detected remaining capacity, a current consumption, and a time of use of the load.

9. The battery pack as claimed in claim 8, wherein the microcomputer comprises a user interface that receives an expected time of use from a user and uses the expected time of use as the time of use of the load.

10. A battery pack, comprising:
a battery cell;
a charging device connected between the battery cell and a first node;
a discharging device connected between the first node and a load;
a current converting unit connected in parallel to the discharging device; and
a microcomputer that controls the charging device, the discharging device, and the current converting unit based on an amount of discharge current of the battery cell and a remaining capacity of the battery cell.

11. The battery pack as claimed in claim 10, wherein the current converting unit adjusts a discharge current to the load according to the control of the microcomputer.

12. The battery pack as claimed in claim 11, wherein the current converting unit comprises:
a switch that is turned on or off according to the control of the microcomputer; and
a variable resistive circuit element serially connected to the switch.

13. The battery pack as claimed in claim 11, wherein the current converting unit comprises:
at least two switches controlled by the microcomputer; and at least two resistive circuit elements respectively serially connected to the at least two switches, and having different resistance values.

14. The battery pack as claimed in claim 11, wherein the current converting unit comprises a variable resistive circuit element, a resistance value of the variable resistive circuit element being varied according by the microcomputer.

15. A battery pack, comprising:
a battery cell;
a charging device connected between the battery cell and a first node;
a discharging device connected between the first node and a load; and
a current converting unit connected in parallel to the discharging device; and
a microcomputer to control the charging device, the discharging device, and the current converting unit, wherein the microcomputer:
detects a remaining capacity of the battery cell;
determines an amount of the discharge current of the battery cell based on the detected remaining capacity, a current consumption, and a time of use of the load.

16. The battery pack as claimed in claim 15, wherein the microcomputer comprises a user interface that receives an expected time of use from a user and uses the expected time of use as the time of use of the load.

17. A method of controlling a battery pack, the method comprising:
detecting a remaining capacity of a battery cell;
comparing the detected remaining capacity with an expected current consumption amount according to a time of use of a load; and
converting a discharge current that is to flow to the load according to the amount of the discharge current and the remaining capacity of the battery cell.

18. The method as claimed in claim 17, further comprising receiving an expected time of use from the user and using the expected time of use as the time of use of the load.

19. (The method as claimed in claim 17, wherein converting the discharge current includes controlling at least one of a state of a switch or a value of a resistive circuit element serially connected to the switch.

* * * * *